Patented July 12, 1927.

1,635,567

UNITED STATES PATENT OFFICE.

HENRY C. P. WEBER, OF EDGEWOOD PARK, PENNSYLVANIA, ASSIGNOR TO WESTING-HOUSE ELECTRIC & MANUFACTURING COMPANY, A CORPORATION OF PENNSYLVANIA.

NONFLAMMABLE VARNISH.

No Drawing. Application filed July 5, 1922. Serial No. 572,960.

This invention relates to varnishes, more particularly to varnishes embodying a solvent which is nonflammable under ordinary conditions.

Hitherto, varnishes were made of a varnish base consisting essentially of resins or asphalts compounded with oils or similar materials. In order to render the same of sufficient fluidity for application to articles to be coated, it was customary to dissolve the same in various solvents generally of organic nature. Said solvents were inflammable and hence dangerous to use and the fumes thereof were detrimental to the health of the workmen. Recently it has become desirable to apply varnish solutions to bodies which had been previously heated and to bodies to be subsequently heated or baked to remove the solvent and cause the varnish base to set and adhere to the body being coated. Such procedure was highly dangerous with prior varnish solutions on account of the volatility and combustibility of the solvents used, particularly in the case of baking varnishes.

In order to obviate the dangers inherent in a flammable solvent, it has been proposed to substitute therefor an emulsified solution of the varnish base in water. Generally this was accomplished by a suitable emulsifying agent, such as ammonia and a soap, which caused the particles of varnish base to emulsify with the water vehicle.

Such latter solutions were comparatively unstable and had but a limited use. The amount of varnish base in emulsion was comparatively small and it required special methods of application and drying thereof on the body being coated to obtain a coating of sufficient thickness for ordinary use. Furthermore, such solutions were unstable, especially in warm weather, which caused separation of the ingredients thereof.

My invention is directed to an improvement in varnish solutions which obviates the disadvantages above set forth, it being among the objects thereof to provide a varnish solution which shall be simple to prepare, stable under all changes of atmospheric conditions, non-flammable and the proportions of which may be readily changed for various applications of the varnish.

In practising my invention, I provide a varnish base which may consist of a gum such as gilsonite, naphthol pitch, petroleum asphalt, stearin pitch or the like, compounded with suitable oily material, such as tung oil, linseed oil, fish oil, castor oil or the like. The ingredients of the varnish base may be compounded in any desired manner well known in the art.

I further provide a mixture of solvents containing halogenated aromatic and aliphatic hydrocarbons which have been especially treated to free the same from acid constituents. Specifically, I prefer to utilize a mixture of chlorbenzols and carbon tetrachloride. I may use various proportions of solvents, but, preferably, I confine myself to a mixture containing from 15 to 60% of carbon tetrachloride and the remainder monochlorbenzol.

A specific example of a varnish solution made in accordance with this invention is as follows: I provide a varnish base made by melting together about 1100 kilograms of gilsonite, 600 kilograms of linseed oil and 125 kilograms of castor oil. I then prepare 2750 liters of solvent consisting of equal parts of carbon tetrachloride and monochlorbenzol, the mixture having a density of 1.408.

The solvent is treated with an adsorbent material to remove any traces of hydrochloric acid which may be present in the solvent because of slight decomposition of the chlor compounds therein. This may be accomplished by agitating the solvent with, or passing the same through, a bed containing an adsorbent material such as aluminum hydroxide, silica gel, fuller's earth, bone black or the like. The varnish base is then dissolved in the treated solvent, preferably with the aid of heat.

Such a solution has the slight disadvantage that, if a body is coated therewith and the solvent is not completely removed by the subsequent drying or baking operation, a small amount of acid product may develop and cause corrosion of the material and consequent cracking or peeling of the varnish coating. In order to reduce or eliminate this effect, I provide a restraining agent which acts in such a manner as to absorb and neutralize any acid products which may develop in the varnish coating. Various solid or liquid restraining agents may be utilized, the essential requirement being that they be capable of developing slightly alkaline substances in the varnish. Among such agents are urea, substituted ureas, anilin and dimethyl anilin. Generally less than 1% thereof is sufficient to accomplish the desired result.

My varnish solution has several advantages over prior solutions of this character in that it is stable, does not develop products which may be injurious to the varnish or to the body coated therewith, and the proportions of ingredients thereof may be varied to provide varnish solutions of different characters for various uses. For instance, for hot dipping, I may raise the boiling point of the solution by adding a greater proportion of monochlorbenzol and correspondingly reducing the quantity of carbon tetrachloride. This also allows the use of a solution containing less solvent, thereby reducing the cost of the varnish. In order to obtain a quick-drying varnish solution, I increase the proportion of carbon tetrachloride and I may substitute therefor, either wholly or in part, a non-flammable material having a lower boiling point, such as dichlormethane or the like.

Although I have described my invention setting forth a specific example thereof, it is to be understood that it is not limited to the details set forth and that various changes may be made therein within the scope thereof. For instance, I may substitute various chlorinated hydrocarbons of similar nature for those specified and other materials for treatment of the solvent to remove acid may be used. The restraining agents which I have mentioned are obviously not the only ones which may be used.

I claim as my invention:

1. A varnish solution comprising a varnish base, a solvent containing monochlorbenzol and carbon tetrachloride and a small amount of restraining agent.

2. A varnish solution comprising a varnish base, a solvent containing monochlorbenzol and carbon tetrachloride free from acid constituents and a small amount of restraining agent.

3. A varnish solution comprising a varnish base, a solvent containing monochlorbenzol and carbon tetrachloride free from acid constituents and a small amount of urea.

4. A varnish solution comprising a varnish base, a solvent containing monochlorbenzol and carbon tetrachloride free from acid constituents and less than 1% of urea.

In testimony whereof, I have hereunto subscribed my name this first day of July, 1922.

HENRY C. P. WEBER.